United States Patent
Kouskoulas et al.

(10) Patent No.: US 9,507,945 B2
(45) Date of Patent: Nov. 29, 2016

(54) METHOD AND APPARATUS FOR AUTOMATED VULNERABILITY DETECTION

(71) Applicant: The Johns Hopkins University, Baltimore, MD (US)

(72) Inventors: Yanni A. Kouskoulas, Silver Spring, MD (US); Douglas C. Schmidt, Severna Park, MD (US); C. Durward McDonell, III, Olney, MD (US); Laura J. Glendenning, Columbia, MD (US); Ryan W. Gardner, Columbia, MD (US); David J. Heine, Columbia, MD (US); Margaret F. Lospinuso, Laurel, MD (US); Forest C. Deal, Jr., Catonsville, MD (US); David R. Zaret, Columbia, MD (US); Vina H. Nguyen, Bethesda, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 14/242,028

(22) Filed: Apr. 1, 2014

(65) Prior Publication Data
US 2014/0298472 A1    Oct. 2, 2014

Related U.S. Application Data

(60) Provisional application No. 61/806,988, filed on Apr. 1, 2013.

(51) Int. Cl.
*G06F 21/52*     (2013.01)
*G06F 21/57*     (2013.01)
*G06F 21/54*     (2013.01)

(52) U.S. Cl.
CPC .................................. *G06F 21/577* (2013.01)

(58) Field of Classification Search
CPC ........ G06F 8/3135; G06F 8/313; G06F 8/40; G06F 8/427; G06F 8/434; G06F 11/3636
See application file for complete search history.

(56) References Cited

U.S. PATENT DOCUMENTS

| | | | |
|---|---|---|---|
| 5,710,927 A * | 1/1998 | Robison | 717/155 |
| 5,963,739 A | 10/1999 | Homeier | |
| 6,029,002 A | 2/2000 | Afifi et al. | |

(Continued)

OTHER PUBLICATIONS

A weakest precondition approach to active attacks analysis. Balliu et al. ACM(2009).*

(Continued)

*Primary Examiner* — Venkat Perungavoor
(74) *Attorney, Agent, or Firm* — Noah J. Hayward (57) ABSTRACT

A method executable via operation of configured processing circuitry to identify vulnerabilities in program code may include receiving a program and employing a disassembler to disassemble the program, generating a function call tree for the program based on disassembly of the program, receiving an indication of a post condition for which analysis of the program is desired, transforming program statements into logical equations, simplifying the logical equations, propagating post conditions backwards via Dijkstra's weakest precondition variant, analyzing aliases and processing loops to generate a precondition, and using an automated solver to determine whether the precondition is realizable and, if so, providing program inputs required to realize the precondition.

20 Claims, 6 Drawing Sheets

(56) References Cited

U.S. PATENT DOCUMENTS

| | | |
|---|---|---|
| 6,374,368 B1 | 4/2002 | Mitchell et al. |
| 8,271,404 B2 | 9/2012 | Gulwani et al. |
| 8,365,152 B2 | 1/2013 | Balakrishnan et al. |
| 8,381,192 B1* | 2/2013 | Drewry et al. ............... 717/128 |
| 8,813,043 B2* | 8/2014 | Condit et al. ................ 717/136 |
| 2003/0237077 A1* | 12/2003 | Ghiya et al. ................. 717/151 |
| 2009/0222799 A1* | 9/2009 | Stewart et al. .............. 717/143 |
| 2009/0292941 A1* | 11/2009 | Ganai et al. ....................... 714/2 |
| 2010/0070955 A1* | 3/2010 | Kahlon ......................... 717/141 |
| 2010/0281469 A1* | 11/2010 | Wang et al. .................. 717/128 |
| 2011/0072517 A1* | 3/2011 | Tripp ............................. 726/25 |
| 2011/0258606 A1* | 10/2011 | Vechev et al. ............... 717/126 |
| 2012/0011489 A1 | 1/2012 | Murthy et al. |
| 2012/0060142 A1* | 3/2012 | Fliess et al. ................. 717/102 |
| 2012/0179935 A1 | 7/2012 | Wang et al. |
| 2012/0266133 A1* | 10/2012 | Imai et al. .................... 717/114 |
| 2012/0304158 A1* | 11/2012 | Li et al. ........................ 717/132 |
| 2012/0311713 A1 | 12/2012 | Amit et al. |
| 2012/0331350 A1* | 12/2012 | Dhoolia et al. .............. 714/38.1 |
| 2013/0031531 A1* | 1/2013 | Keynes et al. ............... 717/126 |
| 2013/0283248 A1* | 10/2013 | Abadi et al. ................. 717/136 |
| 2016/0120906 A1 | 5/2016 | Galetto et al. |

OTHER PUBLICATIONS

A Framework for Formal Verification of Concurrent Software. de Sousa. Utrecht Universiteit-MSc Thesis(2012).*

Analyzing Loop Paths for Execution Time Estimation. Roychoudhury et al. Springer(2005).*

Efficient weakest preconditions. Leino. Microsoft. Elselvier(2005).*

Creating Vulnerability Signatures Using Weakest Preconditions. Brumley et al. 2007.*

* cited by examiner

METHOD AND APPARATUS FOR AUTOMATED VULNERABILITY DETECTION

CROSS-REFERENCE TO RELATED APPLICATIONS

This application claims priority to and the benefit of U.S. Provisional Application Ser. No. 61/806,988 filed on Apr. 1, 2013, the entire contents of which are hereby incorporated herein by reference.

STATEMENT OF GOVERNMENTAL INTEREST

This invention was made with government support under contract number FA8750-09-C-0144 awarded by the U.S. Air Force Research Lab. The government has certain rights in the invention.

TECHNICAL FIELD

Example embodiments generally relate to techniques for analyzing vulnerabilities in software and, in particular, relate to apparatuses (and/or methods executable by configured apparatuses) that are configured for employing the same.

BACKGROUND

With the advent of computers and communication networks, the ability to generate, store, utilize, distribute, publish or otherwise share content and information has vastly improved. This has further led to the routine transfer of large amounts of data, content and information between devices. While much of the material transferred between devices is exactly that which is desired by the corresponding users, malicious software (or malware) can also be transferred among devices. The malware may pose privacy or security concerns, or it may be disruptive or even destructive and costly in some situations.

In order to attempt to minimize the impact of malware, anti-virus software, network operations centers, network security offices and other entities may operate to attempt to accurately and quickly determine whether a received piece of unknown software is or contains malware. In particular, it may be desirable to ensure that high-assurance applications have, or do not have, certain functionality, or prove that the software behaves correctly in edge cases and/or does not corrupt valuable information. However, the ability to perform analysis of such software in order to reason about its behavior can be difficult to accomplish in a way that balances computation time, accuracy and human comprehensibility.

Accordingly, it may be desirable to continue to develop improved and/or more efficient mechanisms by which protection against malware may be provided while striking an appropriate balance relative to the factors discussed above.

BRIEF SUMMARY OF SOME EXAMPLES

Accordingly, some example embodiments may enable the provision of a relatively scalable and efficient solution for addressing the issues described above. In this regard, for example, some embodiments may enable the provision of a configurable tool for analyzing programs to determine how to cause them to produce a desired end state, which we call the post condition. As such, for example, the configurable tool may take a program and a post condition and compute a precondition which, when satisfied before program execution, guarantees that when the program terminates it will leave the computer or processing circuitry executing the program in a state that satisfies the post condition.

In one example embodiment, an apparatus for identifying vulnerabilities in program code is provided. The apparatus may include processing circuitry configured for receiving a program and employing a disassembler to disassemble the program, generating a function call tree for the program based on disassembly of the program, receiving an indication of a post condition for which analysis of the program is desired, transforming program statements into logical equations, simplifying the logical equations, propagating post conditions backwards via Dijkstra's weakest preconditions variant, analyzing aliases and processing loops to generate a precondition, and using an automated solver to determine whether the precondition is realizable and, if so, providing program inputs required to realize the precondition.

In another example embodiment, a method executable via operation of configured processing circuitry to identify vulnerabilities in program code is provided. The method may include receiving a program and employing a disassembler to disassemble the program, generating a function call tree for the program based on disassembly of the program, receiving an indication of a post condition for which analysis of the program is desired, transforming program statements into logical equations, simplifying the logical equations, propagating post conditions backwards via Dijkstra's weakest preconditions variant, analyzing aliases and processing loops to generate a precondition, and using an automated solver to determine whether the precondition is realizable and, if so, providing program inputs required to realize the precondition.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

As indicated above, some embodiments of the present invention may relate to the provision of malicious software detection. As such, some example embodiments may provide a tool for identifying vulnerabilities that would allow an attacker to gain control over execution of a given program. In this regard, some examples may enable a user to identify exploitable vulnerabilities that would allow an attacker to introduce and execute code of their choosing. In particular, some example embodiments may find particular inputs that allow an attacker to manipulate exploitable indirect writes and indirect jumps.

In some cases, all vulnerabilities that depend on writing executable code into memory at runtime and transferring the execution path to the new code may be detected by this tool and the corresponding techniques the tool employs. Some example situations that example embodiments may be enabled to detect and exploit include buffer overflows, format string manipulation, data prevarication, and weak module authentication schemes. The approach can also detect and describe how to exploit classes of vulnerabilities as yet undiscovered and unnamed that rely upon manipulation of indirect writes and indirect jumps.

In some cases, when used as an interactive tool driven by an analyst, an example embodiment might be used for preliminary exploration of an interesting binary, be used by the analyst to set up a more detailed analysis, or be used interactively for probing selected results from a batch-oriented analysis. When used as a batch-oriented tool, some example embodiments may involve pre-selection of the paths to be analyzed, such that paths affected by external user input, or that propagate constants, are marked. The batch environment may therefore be responsible for separating out the functions to be analyzed, for setting up the input conditions for these functions, for parceling out the work to the available hardware, for monitoring progress, and/or for gathering reports. As a batch-oriented tool it might be feasible to use an example embodiment much as fuzzing tools are often used, as a background process that has a standard setup, and is simply always there when there are spare cycles, performing pre-defined analysis on paths that were selected by some initial analytical process. Thus, for example, worms, viruses and other malware may be detected to improve the security and stability of platforms that operate on executable code, even when slight changes have been made to the code. Moreover, embodiments may be applicable to personal computer (PC) programs, mobile terminal programs or executable code for use with any execution platform.

Figure 1:
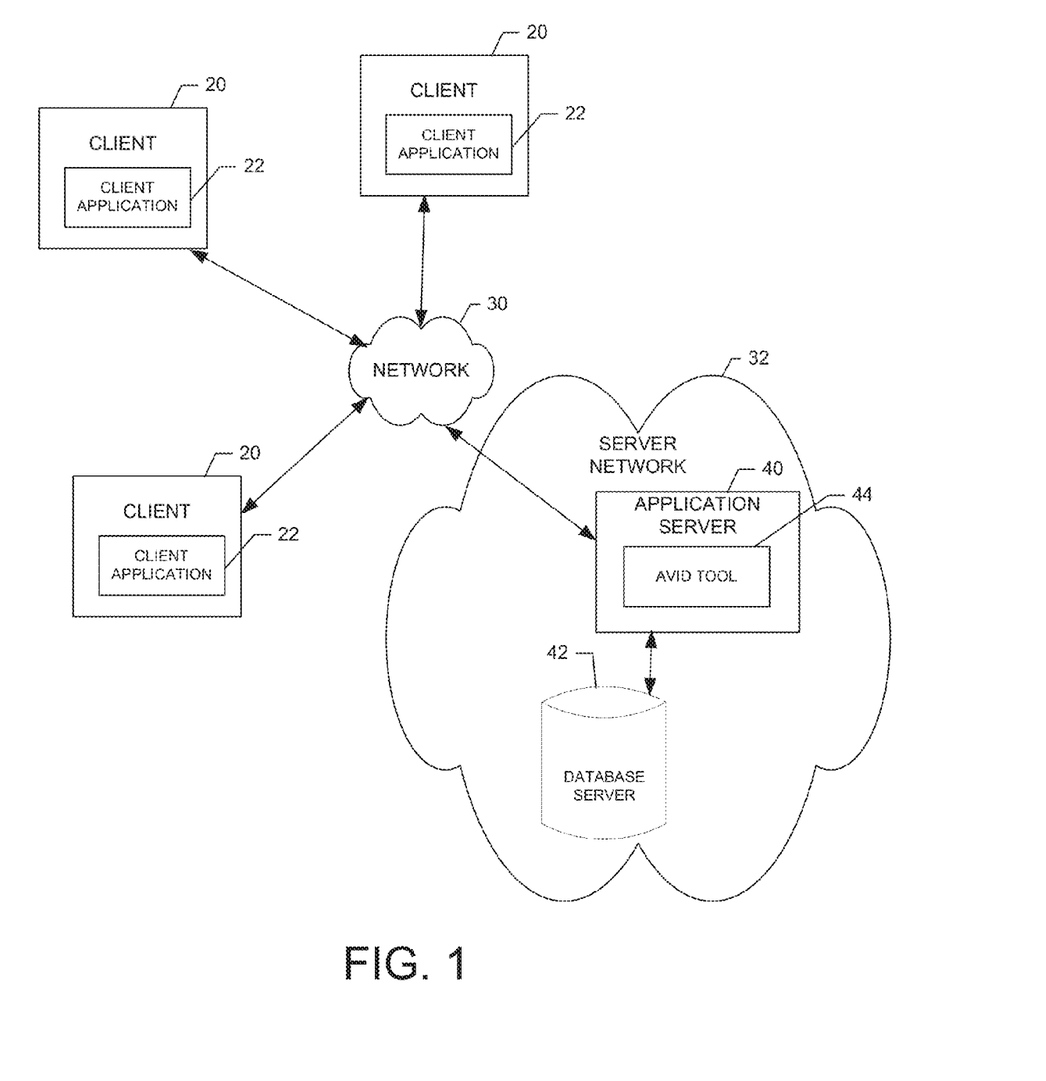
FIG. 1 illustrates a functional block diagram of a system that may be useful in connection with automated vulnerability identification according to an example embodiment.

An example embodiment of the invention will now be described in reference to FIG. 1. As shown in FIG. 1, a system 10 according to an example embodiment may include one or more client devices (e.g., clients 20). Notably, although FIG. 1 illustrates three clients 20, it should be appreciated that a single client or many more clients 20 may be included in some embodiments and thus, the three clients 20 of FIG. 1 are simply used to illustrate a potential for a multiplicity of clients 20 and the number of clients 20 is in no way limiting to other example embodiments. In this regard, example embodiments are scalable to inclusion of any number of clients 20 being tied into the system 10. Furthermore, in some cases, some embodiments may be practiced on a single client without any connection to the system 10.

The example described herein will be related to an asset comprising a computer or analysis terminal to illustrate one example embodiment. However, it should be appreciated that example embodiments may also apply to any asset including, for example, any programmable device that is capable of receiving and analyzing files as described herein.

The clients 20 may, in some cases, each be associated with a single organization, department within an organization, or location (i.e., with each one of the clients 20 being associated with an individual analyst of an organization, department or location). However, in some embodiments, each of the clients 20 may be associated with different corresponding locations, departments or organizations. For example, among the clients 20, one client may be associated with a first facility of a first organization and one or more of the other clients may be associated with a second facility of either the first organization or of another organization.

Each one of the clients 20 may include or otherwise be embodied as computing device (e.g., a computer, a network access terminal, a personal digital assistant (PDA), cellular phone, smart phone, or the like) capable of communication with or over a network 30. As such, for example, each one of the clients 20 may include (or otherwise have access to) memory for storing instructions or applications for the performance of various functions and a corresponding processor for executing stored instructions or applications. Each one of the clients 20 may also include software and/or corresponding hardware for enabling the performance of the respective functions of the clients 20 as described below. In an example embodiment, one or more of the clients 20 may include a client application 22 configured to operate in accordance with an example embodiment of the present invention. In this regard, for example, the client application 22 may include software for enabling a respective one of the clients 20 to communicate with the network 30 for requesting and/or receiving information and/or services via the network 30. Moreover, in some embodiments, the information or services that are requested via the network may be provided in a software as a service (SAS) environment. The information or services receivable at the client applications 22 may include deliverable components (e.g., downloadable software to configure the clients 20, or information for consumption/processing at the clients 20). As such, for example, the client application 22 may include corresponding executable instructions for configuring the client 20 to provide corresponding functionalities for processing and/or analyzing binary code as described in greater detail below.

The network 30 may be a data network, such as a local area network (LAN), a metropolitan area network (MAN), a wide area network (WAN) (e.g., the Internet), and/or the like, which may couple the clients 20 to devices such as processing elements (e.g., personal computers, server computers or the like) and/or databases. Communication between the network 30, the clients 20 and the devices or databases (e.g., servers) to which the clients 20 are coupled may be accomplished by either wireline or wireless communication mechanisms and corresponding communication protocols.

In an example embodiment, devices to which the clients 20 may be coupled via the network 30 may include one or more application servers (e.g., application server 40), and/or a database server 42, which together may form respective elements of a server network 32. Although the application server 40 and the database server 42 are each referred to as "servers," this does not necessarily imply that they are embodied on separate servers or devices. As such, for example, a single server or device may include both entities and the database server 42 could merely be represented by a database or group of databases physically located on the same server or device as the application server 40. The application server 40 and the database server 42 may each include hardware and/or software for configuring the application server 40 and the database server 42, respectively, to perform various functions. As such, for example, the application server 40 may include processing logic and memory enabling the application server 40 to access and/or execute stored computer readable instructions for performing various functions. In an example embodiment, one function that may be provided by the application server 40 may be the provision of access to information and/or services related to operation of the terminals or computers with which the clients 20 are associated. For example, the application server 40 may be configured to provide for storage of information descriptive of certain binary codes associated with software or content being analyzed (e.g., in the database server 42). The information may include a program or series of executable files and/or instructions that are executable by one or more of the clients 20, and for which analysis using a tool of an example embodiment is desired. The application server 40 may host functionality for analyzing the program in accordance with an example embodiment. Alternatively or additionally, the application server 40 may be configured to provide analytical tools for use by the clients 20 to conduct such analysis in accordance with example embodiments.

In some embodiments, for example, the application server 40 may therefore include an instance of an automated vulnerability identification demonstration (AVID) tool 44 comprising stored instructions for handling activities associated with practicing example embodiments as described herein. As such, in some embodiments, the clients 20 may access the AVID tool 44 online and utilize the services provided thereby. However, it should be appreciated that in other embodiments, the AVID tool 44 may be provided from the application server 40 (e.g., via download over the network 30) to one or more of the clients 20 to enable recipient clients to instantiate an instance of the AVID tool 44 for local operation. As yet another example, the AVID tool 44 may be instantiated at one or more of the clients 20 responsive to downloading instructions from a removable or transferable memory device carrying instructions for instantiating the AVID tool 44 at the corresponding one or more of the clients 20. In such an example, the network 30 may, for example, be a peer-to-peer (P2P) network where one of the clients 20 includes an instance of the AVID tool 44 to enable the corresponding one of the clients 20 to act as a server to other clients 20.

In an example embodiment, the application server 40 may include or have access to memory (e.g., internal memory or the database server 42) for storing instructions or applications for the performance of various functions and a corresponding processor for executing stored instructions or applications. For example, the memory may store an instance of the AVID tool 44 configured to operate in accordance with an example embodiment of the present invention. In this regard, for example, the AVID tool 44 may include software for enabling the application server 40 to communicate with the network 30 and/or the clients 20 for the provision and/or receipt of information associated with performing activities as described herein. Moreover, in some embodiments, the application server 40 may include or otherwise be in communication with an access terminal (e.g., a computer including a user interface) via which analysts may interact with, configure or otherwise maintain the system 10.

As such, the environment of FIG. 1 illustrates an example in which provision of content and information associated with the analysis such as, for example, security or intelligence operations may be accomplished by a particular entity (namely the AVID tool 44 residing at the application server 40). However, it should be noted again that the AVID tool 44 could alternatively handle provision of content and information within a single organization. Thus, in some embodiments, the AVID tool 44 may be embodied at one or more of the clients 20 and, in such an example, the AVID tool 44 may be configured to handle provision of content and information associated with analytical tasks that are associated only with the corresponding single organization. Access to the AVID tool 44 may therefore be secured as appropriate for the organization involved and credentials of individuals or analysts attempting to utilize the tools provided herein.

Figure 2:
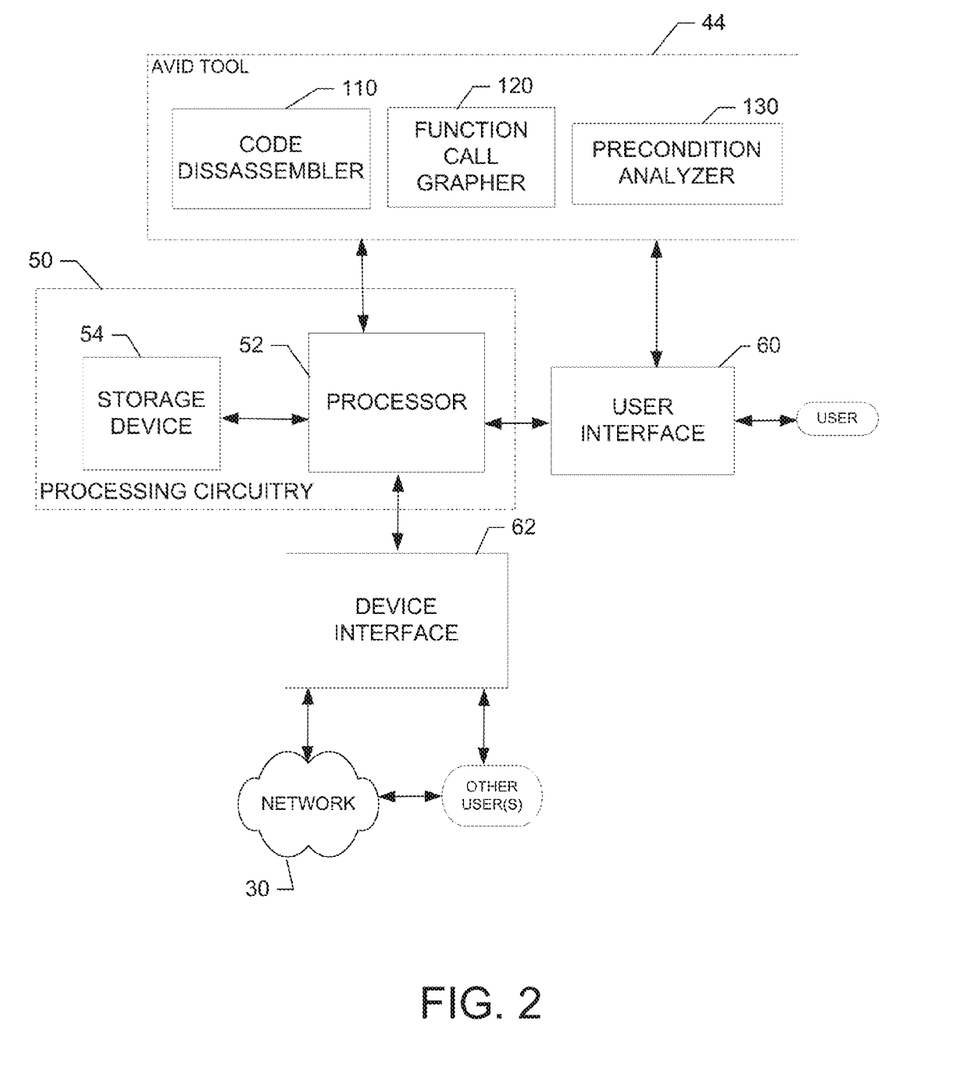
FIG. 2 illustrates a functional block diagram of an apparatus that may be useful in connection with automated vulnerability identification according to an example embodiment.

An example embodiment of the invention will now be described with reference to FIG. 2. FIG. 2 shows certain elements of an apparatus for provision of the analytical tools described herein according to an example embodiment. The apparatus of FIG. 2 may be employed, for example, on a client (e.g., any of the clients 20 of FIG. 1) or a variety of other devices (such as, for example, a network device, server, proxy, or the like (e.g., the application server 40 of FIG. 1)). Alternatively, embodiments may be employed on a combination of devices. Accordingly, some embodiments of the present invention may be embodied wholly at a single device (e.g., the application server 40 or one or more clients 20) or by devices in a client/server relationship (e.g., the application server 40 and one or more clients 20). Furthermore, it should be noted that the devices or elements described below may not be mandatory and thus some may be omitted in certain embodiments.

Referring now to FIG. 2, an apparatus for provision of analytical tools for analyzing software in accordance with an example embodiment is provided. The apparatus may be an embodiment of the AVID tool 44 or a device hosting the AVID tool 44. As such, configuration of the apparatus as described herein may transform the apparatus into the AVID tool 44. In an example embodiment, the apparatus may include or otherwise be in communication with processing circuitry 50 that is configured to perform data processing, application execution and other processing and management services according to an example embodiment of the present invention. In one embodiment, the processing circuitry 50 may include a storage device 54 and a processor 52 that may be in communication with or otherwise control a user interface 60 and a device interface 62. As such, the processing circuitry 50 may be embodied as a circuit chip (e.g., an integrated circuit chip) configured (e.g., with hardware, software or a combination of hardware and software) to perform operations described herein. However, in some embodiments, the processing circuitry 50 may be embodied as a portion of a server, computer, laptop, workstation or even one of various mobile computing devices. In situations where the processing circuitry 50 is embodied as a server or at a remotely located computing device, the user interface 60 may be disposed at another device (e.g., at a computer terminal or client device such as one of the clients 20) that may be in communication with the processing circuitry 50 via the device interface 62 and/or a network (e.g., network 30).

The user interface 60 may be in communication with the processing circuitry 50 to receive an indication of a user input at the user interface 60 and/or to provide an audible, visual, mechanical or other output to the user. As such, the user interface 60 may include, for example, a keyboard, a mouse, a joystick, a display, a touch screen, a microphone, a speaker, a cell phone, or other input/output mechanisms. In embodiments where the apparatus is embodied at a server or other network entity, the user interface 60 may be limited or even eliminated in some cases. Alternatively, as indicated above, the user interface 60 may be remotely located.

The device interface 62 may include one or more interface mechanisms for enabling communication with other devices and/or networks. In some cases, the device interface 62 may be any means such as a device or circuitry embodied in either hardware, software, or a combination of hardware and software that is configured to receive and/or transmit data from/to a network and/or any other device or module in communication with the processing circuitry 50. In this regard, the device interface 62 may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods. In situations where the device interface 62 communicates with a network, the network may be any of various examples of wireless or wired communication networks such as, for example, data networks like a Local Area Network (LAN), a Metropolitan Area Network (MAN), and/or a Wide Area Network (WAN), such as the Internet.

In an example embodiment, the storage device 54 may include one or more non-transitory storage or memory devices such as, for example, volatile and/or non-volatile memory that may be either fixed or removable. The storage device 54 may be configured to store information, data, applications, instructions or the like for enabling the apparatus to carry out various functions in accordance with example embodiments of the present invention. For example, the storage device 54 could be configured to buffer input data for processing by the processor 52. Additionally or alternatively, the storage device 54 could be configured to store instructions for execution by the processor 52. As yet another alternative, the storage device 54 may include one of a plurality of databases (e.g., database server 42) that may store a variety of files, contents or data sets. Among the contents of the storage device 54, applications (e.g., client application 22 or service application 42) may be stored for execution by the processor 52 in order to carry out the functionality associated with each respective application.

The processor 52 may be embodied in a number of different ways. For example, the processor 52 may be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. In an example embodiment, the processor 52 may be configured to execute instructions stored in the storage device 54 or otherwise accessible to the processor 52. As such, whether configured by hardware or software methods, or by a combination thereof, the processor 52 may represent an entity (e.g., physically embodied in circuitry) capable of performing operations according to embodiments of the present invention while configured accordingly. Thus, for example, when the processor 52 is embodied as an ASIC, FPGA or the like, the processor 52 may be specifically configured hardware for conducting the operations described herein. Alternatively, as another example, when the processor 52 is embodied as an executor of software instructions, the instructions may specifically configure the processor 52 to perform the operations described herein.

In an example embodiment, the processor 52 (or the processing circuitry 50) may be embodied as, include or otherwise control the AVID tool 44, which may be any means such as a device or circuitry operating in accordance with software or otherwise embodied in hardware or a combination of hardware and software (e.g., processor 52 operating under software control, the processor 52 embodied as an ASIC or FPGA specifically configured to perform the operations described herein, or a combination thereof) thereby configuring the device or circuitry to perform the corresponding functions of the AVID tool 44 as described below.

The AVID tool 44 manager may include tools to facilitate the creation and distribution of analysis results via the network 30. In an example embodiment, the analysis results may include reports indicating threats identified and/or potential threats that merit further analysis. The reports may be generated on the basis of analytical processing performed by the AVID tool 44. In this regard, the AVID tool 44 may be configured to process binary code or programs that are provided thereto to identify vulnerabilities associated with the code or programs.

In some embodiments, the AVID tool 44 may further include one or more components that contribute to the performance of the tasks or operations associated therewith. For example, as shown in FIG. 2, the AVID tool 44 may include a code disassembler 110, a function call grapher 120, and/or a precondition analyzer 130. Each of the AVID tool 44, the code disassembler 110, the function call grapher 120, and the precondition analyzer 130 may be any means such as a device or circuitry operating in accordance with software or otherwise embodied in hardware or a combination of hardware and software (e.g., processor 52 operating under software control, the processor 52 embodied as an ASIC or FPGA specifically configured to perform the operations described herein, or a combination thereof) thereby configuring the device or circuitry to perform the corresponding functions of the AVID tool 44, the code disassembler 110, the function call grapher 120, and the precondition analyzer 130, respectively, as described herein.

In an example embodiment, the code disassembler 110 may be configured to disassemble code (e.g., machine code) into constituent parts that can then be analyzed by the function call grapher 120 to generate a function call tree. The function call tree may enable the user to see a graphical representation of all of the function calls associated with the program being analyzed. After the function call tree has been generated, the function call tree may be displayed (e.g., via the user interface 60) and the user may be enabled to select (e.g., via the user interface 60) a particular location or locations at which the precondition analyzer 130 will conduct analysis. The user may also utilize the user interface 60 to enter a post condition to be applied for the analysis. The AVID tool 44 may then be called to execute analysis at the corresponding location (e.g., address) based on the specified post condition.

Figure 3:
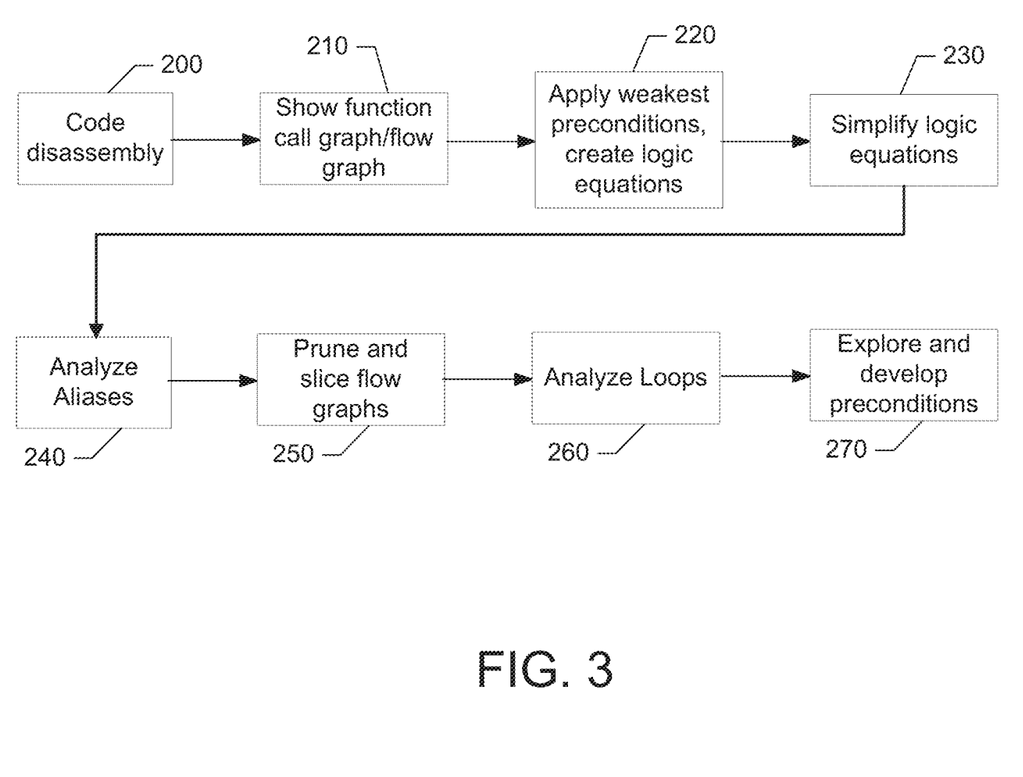
FIG. 3 illustrates a series of process flows that may be supported by an apparatus or system configured in accordance with an example embodiment.

FIG. 3 illustrates a block diagram of various functions that are performed by the AVID tool 44 in accordance with an example embodiment. As shown in FIG. 3, code disassembly may initially be conducted at operation 200 (e.g., via the code disassembler 110). A function call tree or graph may then be generated and displayed at operation 210 (e.g., via the function call grapher 120), for the user to identify an address for the analysis to be run and to specify the post condition. At operation 220, weakest preconditions may be applied to create logic equations. The logic equations may then be simplified at operation 230. At operation 240, aliases may be analyzed prior to pruning and slicing of flow graphs at operation 250. Loop analysis may be conducted at operation 260 and then the preconditions can be explored and developed at operation 270. Operations 220 to 270 may be performed via the precondition analyzer 130.

Figure 4:
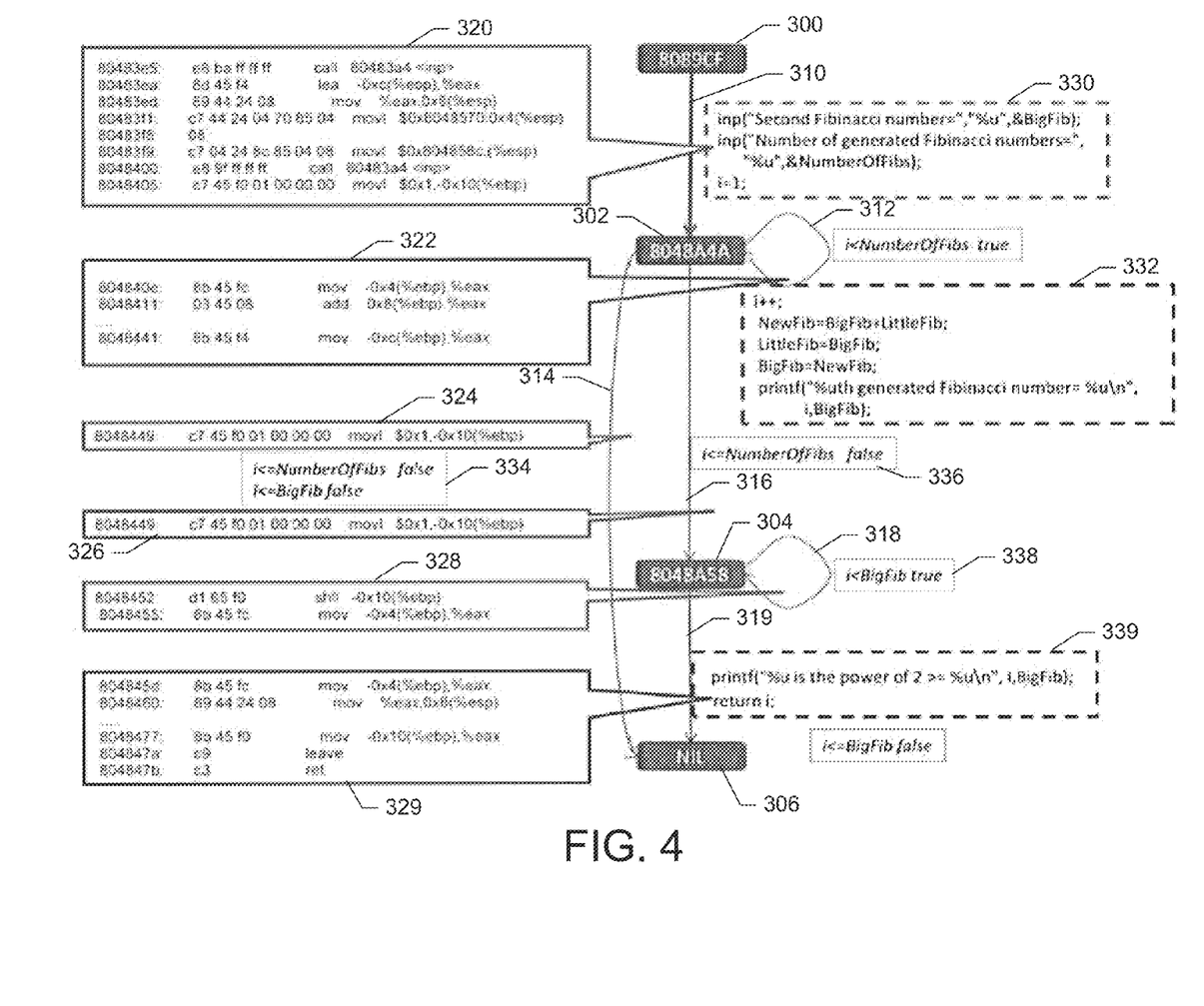
FIG. 4 illustrates one example of an annotated flow graph in accordance with an example embodiment.
Figure 5:
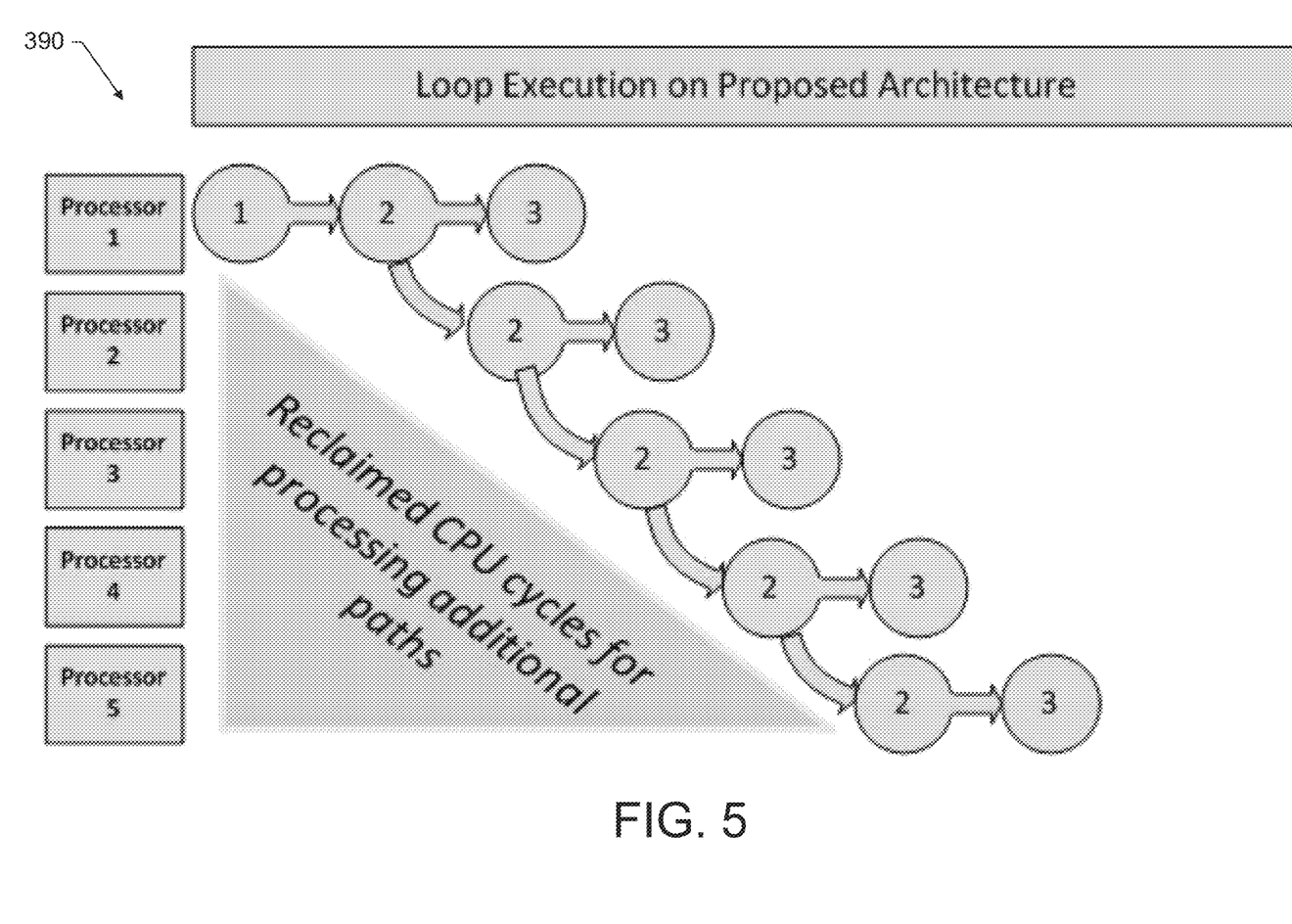
FIG. 5 illustrates a processing paradigm of an example embodiment.

FIG. 4 illustrates one example of an annotated flow graph that may be employed in connection with one example embodiment. The flow graph of FIG. 4 illustrates an example flow graph that may be generated in connection with operation 250 above. The nodes 300, 302, 304 and 306 may each be hexadecimal numbers that represent address values in computer memory where corresponding instructions are located. These nodes may represent entry points, exit points or decision points in machine language code. Arrows 310, 312, 314, 316, 318 and 319 between the nodes indicate that a block of code is run and the state of the computer changes. The set of machine instructions corresponding to the code executed in association with each arrow is provided in solid boxes 320, 322, 324, 326, 328 and 329, respectively. The source code for respective code blocks is provided in the dashed/dotted boxes 330, 332, 334, 336, 338 and 339, respectively.

As indicated above, Dijkstra's weakest preconditions may be applied to create logic equations at operation 220. When applying weakest preconditions to help reason about a program (e.g., a machine code program), each instruction may be transformed (e.g., by the precondition analyzer 130) into a logic equation of the form $$P_n = \sigma_n \bigvee_{n'} (B_{nn'} \wedge Q_{nn'} \wedge P_{n'}),$$

where $\sigma_n$ is the substitution operator for the corresponding node (describing the effect of the corresponding instruction on the computer's state), $B_{nn'}$ is the branch predicate that indicates whether a particular branch will be taken, and $Q_{nn'}$ is the condition that is desired for assertion after execution of the instruction at n, but before execution of n'. When this process is applied to a function, the process may be viewed as transforming the function into a system of logic equations. For a typical function, hundreds of very simple equations may be produced by the process.

The next step in applying weakest preconditions is to simplify or combine the equations in order to generate a smaller (or preferably smallest) system of equations. For example, if one considers the following system of equations:

$P_1 = \sigma_1 P_2$ $P_2 = \sigma_2((P_3 \wedge B_{23}) \vee (P_1 \wedge B_{21}))$ $P_3 = \sigma_3 Q_3$ In the system of equations above, the expression $\sigma_3 Q_3$ can be unambiguously substituted for $P_3$ wherever $P_3$ occurs, thus eliminating $P_3$ from the system of equations. However, the same cannot be accomplished for $P_2$, since $P_2$ is defined in terms of itself. In some cases, an algorithm may be defined for performing simplifications of sets of logic equations, even within potentially large systems of equations.

What follows is an example of an algorithm that can be used to simplify logic equations. Define two sets of equations: a "minimal" set and an "original" set. Initially, the "minimal" set is empty and is filled during the simplification process as the algorithm runs. The "original" set of equations includes the original equations in their original form. These equations may be discarded from the "original" set, either because of substitution or because they are no longer necessary, or because they have been moved to the "minimal" set. At the end of the algorithm, the "original" set will be empty. An equation is defined here as a Boolean/logical expression that describes a predicate in terms of other predicates (e.g., $P_1 = f(P_2, P_3)$). The predicate being solved for may be called the "defined" predicate for the corresponding equation. For the example equation above, the "defined" predicate is $P_1$. References for a particular equation may refer to the predicates used on the right side of the equation, so for the equation above, the references are $P_2$ and $P_3$. A recursively defined equation may be one in which the defined predicate is also one of the references. For example, the equation $P_1 = f(P_1, P_2)$ is a recursively defined equation.

In accordance with one example embodiment, the algorithm may include, for solving for $P_n$, removing $P_n$ from the original set to add it to the "minimal" set. Next, a second operation may include examination of the remaining equations in the "original" set, and recursively defined equations may be removed to add them to the "minimal" set. An equation in the "original" set may then be chosen with the minimal number of references. Its expression may be substituted into the equations that refer to it to serve to minimize the number of references in the final equations. After substitution, there should be no more references to the corresponding predicate, so the corresponding predicate may be removed from the "original" set. If there are any remaining equations in the "original" set, the second operation described above may be repeated. If there are no remaining equations, the algorithm has simplified the equations as much as possible.

When applying weakest preconditions to help reason about machine code programs, care should be taken to identify cases where memory aliasing occurs. As mentioned above, operation 240 may include analysis of aliases. An alias may be created for part of memory having two different variables that point to the same memory address. Aliases in a program can make it more difficult to understand, because changing one variable can affect another that is not explicitly named. The AVID tool 44 may be configured to analyze programs with memory aliases in a number of ways. In some cases, implementation of a generalized axiom of assignment in the context of the machinery used to compute the weakest precondition for a function may be employed. Alternatively or additionally, implementation of a heuristic such as a memory reference family may be employed to eliminate aliasing cases that could not occur in practice.

To implement the general axiom of assignment in the context of weakest preconditions, the definition of substitution operators may be modified. In this regard, for example, each substitution operator $\sigma$ may describe the effect that a particular instruction has on the computer's state in terms of a substitution. For example, the substitution that represents incrementing the variable i by one would be written as [i+1/i]. The substitution that a particular $\sigma$ performs may be specified as a bracketed list of pairs separated by commas, with each pair divided by a forward slash. The value that is going to be substituted in terms of the computer's state at the time of substitution may be provided to the left of the slash. The variable into which the value will be substituted may be provided to the right of the slash. In the context of this technique, each $\sigma$ may be a unary operator that can be applied to a predicate describing the computer's state. The $\sigma$ symbol may be written to the left of the predicate on which it is operating; when evaluated, it composes the function it is applied to with the functions specified to the left of each forward slash, as specified by the variables to the right of the forward slash. If more than one variable is affected by a particular operator, the substitutions may be done simultaneously, not sequentially. Thus, if σ=[g(x,y)/x, h(x,y)/y] is applied to f(x,y), the result may be σ$_f$(x,y)=f(g(x,y), h(x,y)) rather than σ$_f$(x,y)=f(g(x,h(x,y)), h(x,y)).

To correctly analyze memory aliases, the substitution operators must recognize which syntactic constructs are pointers to memory and what other constructs for which they can be aliases. Thus, new substitution operators σ″ (that correctly analyze aliases) may be defined in terms of old substitution operators σ' (which do not correctly handle memory aliases). Assume that σ'=[e/M], where e is some expression and M is a memory reference that is to be substituted; P is the predicate upon which we are operating. Further assume that R={$R_1$, $R_2$, ... $R_n$}, the set of all memory references in P that are syntactically different than M.

$$\sigma''P = \bigvee_{S \in 2^R} (\sigma_S \sigma' P \wedge E_M(S))$$

where σ{$c_1$, $c_2$, ..., $c_n$}=[e/$c_1$, e/$c_2$, ..., e/$c_n$], and $E_M$(S) is a statement of logical equivalence between the underlying data objects referenced by the syntactic forms for each element in S and the subscript M.

Correctly computing the weakest precondition in the presence of memory aliases may create results that are significantly longer and more complicated than analyses performed without considering memory aliases. Some increase in complexity is unavoidable; the technique may produce precise results describing more complicated aliasing cases that it was previously ignoring. However, some of the aliasing cases may describe scenarios that could never occur in practice, which may decrease the computational efficiency of the analysis of aliasing conditions.

The technique of grouping references into memory reference families may simply be a recognition that certain pointers can never alias with each other. For example, pointers that are references computed from a common base register cannot alias if the offset is different. This may be useful because, in practice, many memory references to local variables may be computed as offsets from a common base register (%ebp in the x86 architecture), and memory references to global variables may sometimes be given by absolute memory addresses. Thus, this strategy may make aliasing analysis more efficient.

The AVID tool 44 may be configured to back through a program, one instruction at a time, because doing so may enable computation of how to force the program being analyzed down a particular path. At every step of the analysis, the AVID tool 44 may be configured to keep track of a predicate that describes what the state of the machine must be to follow that path and produce the desired program effect. Backing through the program is done using the axiom of assignment described by Dijkstra and Hoare. To use this technique, the effect of each program statement on the memory state may be described as a simultaneous assignment, converting each into a substitution operator. Application of this substitution operator to a postcondition of that program statement, converts the predicate into a precondition. If the precondition is satisfied and the statement executed, the result is a memory state that satisfies the postcondition. This is, in a nutshell, how the AVID tool 44 analyzes programs. Alternative program analysis techniques tend to rely on separation logic to introduce assumptions about the data structures and pointers that eliminate the possibility of aliases, for all runs of a program. When looking for aliases that might be able to be created, and trying to produce an effect that depends on the aliases, assumptions that preclude these possibilities should not be made.

To handle aliases, every time the AVID tool 44 sees an instruction that writes to memory address w, the AVID tool 44 looks at the predicate that describes constraints on the state of the machine, and identifies all memory references within it, ($r_1$, $r_2$, $r_3$ ... ), including nested references within other memory references. It compares the addresses one-by-one with the address of the memory to which the program is writing (w).

Typically an address is an algebraic expression computing an integer, so for each pairing, the AVID tool 44 creates a pair of equations, (w=ri) and (w≠ri), adding each onto a separate copy of the current predicate, and using the SMT solver to determine whether either is satisfiable. These separate copies of the predicate are like alternate worlds, because they are identical analyses, except that each makes a different assumption about that particular alias. If the first alternate world is unsatisfiable, then the pair are never aliases; if the second is unsatisfiable, the pair are always aliases; if both are satisfiable, then with the current information, the relationship between them is ambiguous. In some cases, efficiency of this strategy may be improved by calling the SMT solver only on memory reference inequalities, without involving the rest of the predicate.

If the AVID tool 44 is able to make a clear determination, then it takes the appropriate assertion (e.g. w=ri, or w≠ri) and adds it to the predicate, resolving the alias. Henceforth, the relationship between the address computed by w and the address computed by ri are stated explicitly (either equal or not equal) in the predicate; no further processing need be done.

If the AVID tool 44 is unable to make a clear determination, then it freezes the state of its computation and continues it in two alternate worlds, one where the AVID tool 44 assumes the addresses are aliases, and the other where it assumes the addresses are not. For each alternate world, it continues with the analysis separately, and ends up splitting the analysis into two for each immediately unresolvable aliasing decision.

Because the AVID tool 44 works backwards through the program, it cannot see what happened in the program's past, only in its future. Consequently, it cannot always immediately determine the truth of resolvable aliases. The AVID tool 44 has the capability to automatically explore ambiguous aliasing cases, with no human intervention. To accomplish this, the AVID tool 44 may leverage the "if-then-else" expressions available through an SMT solver. Accordingly, for example, during analysis, if the AVID tool 44 encounters a memory store that could potentially alias with a memory reference in its current postcondition, the AVID tool 44 substitutes the memory reference with an if-then-else expression that encompasses both possible states simultaneously. If the destination address of the store works out to be the same as the address of the postcondition's memory reference, the expression will end up equal to the value of the store; otherwise, it will end up equal to the original memory reference. Handling aliasing this way enables the AVID tool 44 to describe all possible aliasing combinations in a single expression, and takes advantage of the SMT solver's capabilities to exhaustively search for any alias combinations that are both possible and satisfy the original postconditions.

For developing a set of weakest precondition equations, the analysis according to some embodiments may include unrolling of loops in the code. Loop analysis may be conducted at operation 260. A loop unrolling methodology may facilitate automatic and interactive formal analysis of program operation. Unrolling a loop may eliminate the need to derive the equivalent of a loop invariant to describe the effect of a loop on the state of a system and replace it with a series of simple step by step changes in system state. The processing of loops may include various operations such as 1) the identification and representation of all paths and loops and 2) the computation of loop dependencies to guide the order in which loops can be unrolled. The processing may further include 3) selection by the user of a directed acyclic path from entry point into the program to a target statement where the user wants the program to be, and 4) a determination of the order in which loops along the selected path can be unrolled. The processing may further include 5) processing of loops in order using a loop unrolling approach. The loop unrolling approach could include the employment of a targeted approach for common loops that have been analyzed as a class and for which there is a mechanism to determine if the loop terminates and if so after how many iterations. The loop unrolling approach could alternatively include exercising each loop a predetermined number of times. If a loop terminates, the loop can be marked as processed. As another alternative, the loop unrolling approach may include enabling the user to guide the unrolling of the loops.

A pruning and slicing of flow graphs may be performed at operation 250, as mentioned above. In association with applying the weakest precondition technique to a complex program, the size and complexity of the result may be substantial. In this regard, the result may be a predicate that in most cases is so large that it may be difficult to manipulate, to store in memory, and to interpret. In order to deal with this scalability issue, a two pronged approach may be employed. First, a divide-and-conquer strategy may be employed for reducing the size and complexity of any single execution of the weakest preconditions technique. Then, within each division of the program, a predicate strengthening strategy may be employed to further reduce the complexity of the analysis.

The program may be subdivided into functions, since functions form a natural grouping of instructions imposed by the architecture. This may enable analysis of each function in turn, and thus may reduce the size of the executable code chunk being analyzed at any given time. For any analysis, there will be at least two types of graphs: the first of which may be a function call graph, and the second of which may be a control flow graph for each function, made up of the conjuncts of the logic equation that represents that function.

Representing the program at different levels of abstraction may allow us to pursue a divide-and-conquer strategy. First, a graph of function calls may be constructed to show the relationship between different units of code. Second, a slice of the function call graph may be taken that retains only the directed acyclic graph that leads from the beginning of the program to the function of interest. Each path in the graph may be explored sequentially by analyzing each function in the sequence, starting from the last and moving up. Each function may be analyzed separately, in turn, and function calls not on the direct path may be considered only when their calling function is being analyzed. Successful analysis of a function may produce a precondition that will be used as a post condition in subsequent analysis of the calling function.

Within the analysis of each function, tools that strengthen the precondition by excising parts of the predicate to further simplify the analysis may be employed. However, strengthening the precondition may be a lossy procedure that ensures that global guarantees about the program's behavior can no longer be made. Predicate excision may be done in two ways: by filtering the resulting predicate according to environmental constraints, and by selecting not to expand logic that reasons about specific execution paths.

When considering a partially expanded predicate in disjunctive normal form, sets of conditions relating to the state of the machine at any given time may be included or discarded by retaining or excising disjuncts. During this process, environmental constraints may be conjoined with the predicate logic to determine which disjuncts satisfy the constraints. Disjuncts that don't meet the constraints are excised. During the expansion of a precondition that is required during the weakest preconditions, symbolic representations of predicates may be restricted to having their values substituted into the result and being evaluated. Each time a potential branch is encountered, there may be a symbolic representation of further predicate logic that represents each path. Analysis may be restricted to the family of execution paths that follow one path of a branch by discarding the part of the predicate that represents the other(s).

The AVID tool 44 can and has been implemented with a design to take advantage of the speed and capacity increases available from inexpensive distributed architectures, i.e., cloud architectures, and a method for embedding the AVID tool 44 into Hadoop to manage the distributed computing may be employed. An example embodiment of a cloud-based architecture for the AVID tool 44 may consider, and in some ways be constrained by, a low-cost, low-risk path from the existing, standalone application to execution in the cloud. This may be achieved by breaking the execution by the AVID tool 44 into two distinct parts: one that generates possible paths through the code, and another that processes each path individually, as mentioned above. The result was the ability to parallelize the processing of different paths across multiple processors in the cloud. Thus, for example, a plurality of processors may each process paths independently and in parallel.

To efficiently and correctly determine inputs required to achieve a specified target post condition, the AVID tool 44 includes infrastructure that connects its symbolic analyzer to a satisfiability modulo theories (SMT) solver that solves systems of equations. An example embodiment of the AVID tool 44 has been demonstrated to work with the vices SMT solver, but the AVID tool 44 is not limited to yices and is designed to be compatible with any comparable SMT solver.

Some embodiments of the AVID tool 44 may provide an ability to analyze bodies of code without requiring user interaction at intermediate processing steps. Enabling analysis without user interaction may facilitate cloud-based processing. Accordingly, in some cases a standard set of post conditions that will cover certain families of vulnerabilities may be pre-defined and the AVID tool 44 may be configured to automatically check for the corresponding classes of vulnerabilities.

In some cases, large bodies of code may be processed, and analysis data may be retained (e.g., in the storage device 54). Accordingly, the AVID tool 44 of some embodiments may be configured to employ mechanisms to support addition and retention of provenance metadata, so that there is always a traceable path to identify the source of the binary, the software packages that have operated on the binary, their versions and the dates of processing, and the users who have provided data and invoked software. This capability may be substantially enabling for being able to do large scale automated processing in the cloud.

In accordance with an example embodiment, the AVID tool 44 may be configured to identify vulnerabilities that an attacker could exploit to gain control over execution of a given program. The AVID tool 44 may therefore be configured to focus on gaining control by identifying exploitable vulnerabilities that would allow an attacker to introduce and execute code of their choosing. In particular, the AVID tool 44 is configured to inputs that allow an attacker to manipulate exploitable indirect writes and indirect jumps.

All vulnerabilities that depend on writing executable code into memory at runtime and transferring the execution path to the new code may be detected by this technique. The AVID tool 44 may be enabled to detect and exploit: buffer overflows, format string manipulation, data prevarication, and weak module authentication schemes. The AVID tool 44 can also detect and describe how to exploit classes of vulnerabilities as yet undiscovered and unnamed that rely upon manipulation of indirect writes and indirect jumps.

The AVID tool 44 may be configured to be an interactive tool driven by an analyst, or as a batch oriented tool that can run automatically based on predetermined settings. When used as an interactive tool driven by an analyst, the AVID tool 44 may be used for preliminary exploration of an interesting binary, it could be used by the analyst to set up a more detailed analysis, or it could be used interactively for probing selected results from a batch-oriented analysis.

When used as a batch-oriented tool the AVID tool 44 may expect that the paths to be analyzed would be pre-selected by some other analytical tool, and that other tools, such as those that mark paths affected by external user input, or that propagate constants, would already have been applied before the input fie used by the AVID tool 44 is generated. The batch environment may be responsible for separating out the functions to be analyzed, for setting up the input conditions for these functions, for parceling out the work to the available hardware, for monitoring progress, and for gathering reports. As a batch-oriented tool it might be feasible to use AVID much as fuzzing tools are often used, as a background process that has a standard setup, and is simply always there when there are spare cycles, performing pre-defined analysis on paths that were selected by some initial analytical process.

Figure 6:
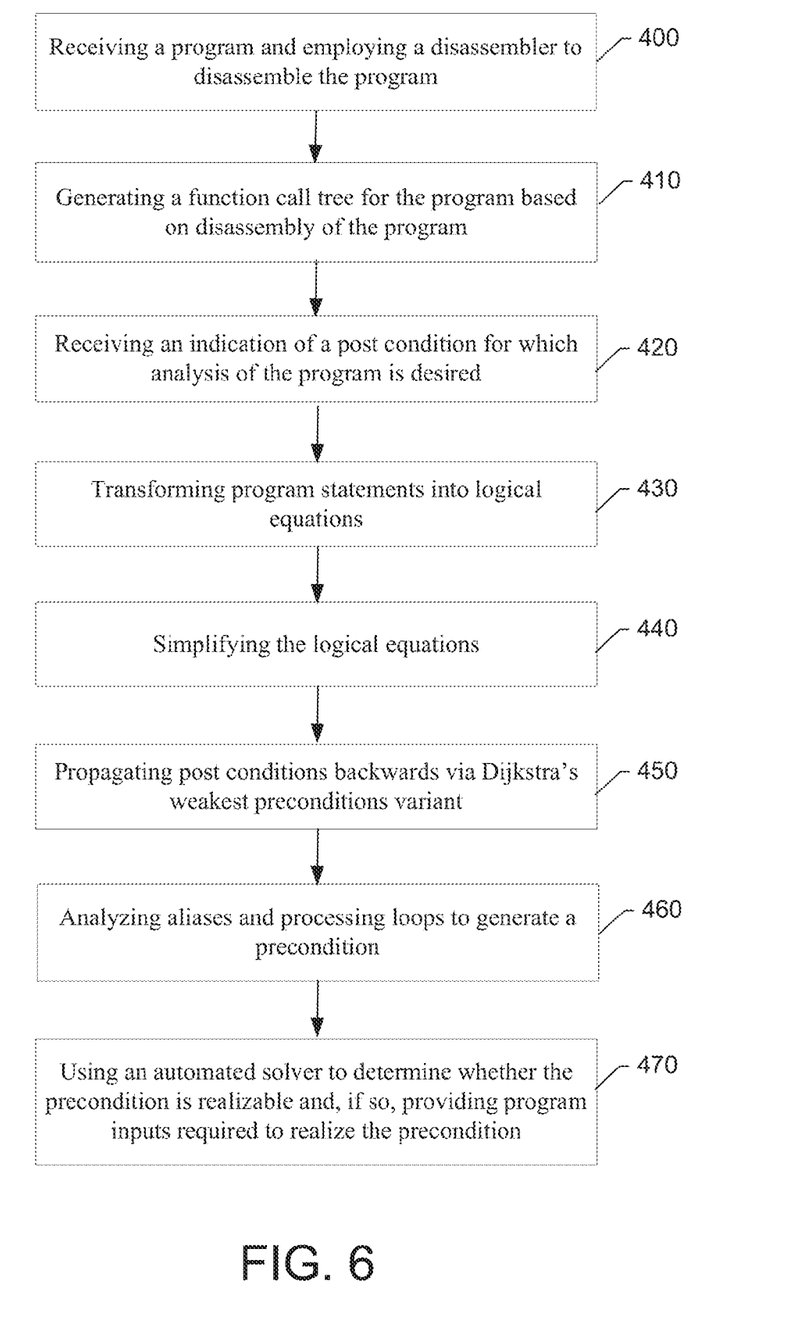
FIG. 6 illustrates a method for identifying vulnerabilities according to an example embodiment.

From a technical perspective, the AVID tool 44 described above may be used to support some or all of the operations described above. As such, the platform described in FIGS. 1-2 may be used to facilitate the implementation of several computer program and/or network communication based interactions. As an example, FIG. 6 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user terminal (e.g., client 20, application server 40, and/or the like) and executed by a processor in the user terminal. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 6, may include receiving a program and employing a disassembler to disassemble the program at operation 400. The method may further include generating a function call tree for the program based on disassembly of the program at operation 410. The method may include receiving an indication of a post condition for which analysis of the program is desired at operation 420 and transforming program statements into logical equations at operation 430. The method may include simplifying the logical equations at operation 440 and propagating post conditions backwards via Dijkstra's weakest preconditions variant at operation 450. The method may include analyzing aliases and processing loops to generate a precondition at operation 460 and using an automated solver to determine whether the precondition is realizable and, if so, providing program inputs required to realize the precondition at operation 470.

In an example embodiment, an apparatus for performing the method of FIG. 6 above may comprise a processor (e.g., the processor 52) or processing circuitry configured to perform some or each of the operations (400-470) described above. The processor may, for example, be configured to perform the operations (400-470) by performing hardware implemented logical functions, executing stored instructions, or executing algorithms for performing each of the operations. In some embodiments, the processor or processing circuitry may be further configured for additional operations or optional modifications to operations 400 to 470. In this regard, for example, processing the reference binary codes may include converting the reference binary codes into source code (or other functional representation code) and breaking the source code into individual functions. In some cases, receiving the indication of the post condition may include referencing a predetermined post condition defined for a batch processing system. In such an example, the batch processing employs an automatically operated check for classes of vulnerabilities defined based on the predetermined post condition. In an example embodiment, receiving the indication of the post condition comprises receiving a user input defining the post condition. In such an example, receiving the user input may further identify a location at which to apply analysis of the program. In some embodiments, the method may further include pruning and slicing of flow graphs. In an example embodiment, analyzing aliases may include executing path generation to identify a plurality of paths associated with the program, and executing path analysis to independently evaluate the paths for aliasing. In some cases, the method may further include describing all possible aliasing combinations in a single expression. In some embodiments, the method may further include describing all possible aliasing combinations in a single expression via employing a satisfiability modulo theories (SMT) solver to exhaustively search for any alias combinations that are both possible and satisfy the post condition. In an example embodiment, processing loops may include identifying and representing all paths and loops, determining loop dependencies to guide the order in which loops are enabled to be unrolled, enabling user selection of a directed acyclic path from an entry point into the program to a target statement where the user desires the program to be, determining the order in which loops along a selected path are enabled to be unrolled, and processing the loops in order using a loop unrolling approach. Example embodiments may therefore enable efficient searching for programs to identify vulnerabilities associated therewith.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A cloud based architecture for automated vulnerability identification demonstration comprising:
    distributed cloud processing circuitry including a plurality of processors configured to execute instructions for:
        receiving a program and employing a disassembler to disassemble the program;
        generating a function call tree for the program based on disassembly of the program;
        receiving an indication of a post condition for which analysis of the program is desired;
        transforming program statements into logical equations;
        simplifying the logical equations;
        propagating each path of the function call tree, based on post conditions, backwards via Dijkstra's weakest preconditions variant;
        analyzing aliases and processing loops to generate a precondition, wherein analyzing aliases is performed using an "if-then-else" expression through a satisfiability modulo theories (STM) solver and processing loops comprises unrolling each of the loops of each path;
        using an automated solver to determine whether the precondition is realizable and, if so,
        providing program inputs required to realize the precondition;
        identifying code vulnerabilities of the program based on the provided program inputs, wherein the code vulnerabilities would allow an attacker to introduce and execute code on a computer executing the program; and
        generating analysis results including at least the identified code vulnerabilities, the analysis results being providable to a user, in an interactive tool, using a user interface.

2. The cloud based architecture of claim 1, wherein receiving the indication of the post condition comprises referencing a predetermined post condition defined for a batch processing system.

3. The cloud based architecture of claim 2, wherein the batch processing employs an automatically operated check for classes of vulnerabilities defined based on the predetermined post condition.

4. The cloud based architecture of claim 1, wherein the processing circuitry is further configured for pruning and slicing of flow graphs.

5. The cloud based architecture of claim 1, wherein analyzing aliases comprises:
    executing path generation to identify possible aliasing conditions associated with the program; and
    executing path analysis to independently evaluate the paths for aliasing.

6. The cloud based architecture of claim 1, wherein the processing circuitry is further configured for describing all possible aliasing combinations in a single expression.

7. The cloud based architecture of claim 6, wherein the processing circuitry is further configured for describing all possible aliasing combinations in a single expression via employing the satisfiability modulo theories (SMT) solver to exhaustively search for any alias combinations that are both possible and satisfy the post condition.

8. The cloud based architecture of claim 1, wherein processing loops further comprises:
    identifying and representing all paths and loops;
    determining loop dependencies to guide the order in which loops are enabled to be unrolled;
    enabling user selection of a directed acyclic path from an entry point into the program to a target statement where the user desires the program to be;
    determining the order in which loops along a selected path are enabled to be unrolled; and
    processing the loops in order using a loop unrolling approach.

9. A method for automated vulnerability identification demonstration executable via operation of cloud based architecture comprising distributed cloud processing circuitry including a plurality of processors, the method comprising:
    receiving a program and employing a disassembler to disassemble the program;

generating a function call tree for the program based on disassembly of the program;

receiving an indication of a post condition for which analysis of the program is desired;

transforming program statements into logical equations;

simplifying the logical equations;

propagating each path of the function call tree, based on post conditions, backwards via Dijkstra's weakest preconditions variant;

analyzing aliases and processing loops to generate a precondition, wherein analyzing aliases is performed using an "if-then-else" expression through a satisfiability modulo theories STM solver and processing loops comprises unrolling each of the loops of each of path;

using an automated solver to determine whether the precondition is realizable and, if so, providing program inputs required to realize the precondition;

identifying code vulnerabilities of the program based on the provided program inputs, wherein the code vulnerabilities would allow an attacker to introduce and execute code on a computer executing the program; and generating analysis results including at least the identified code vulnerabilities, the analysis results being providable to a user, in an interactive tool, using a user interface.

10. The method of claim 9, wherein receiving the indication of the post condition comprises referencing a predetermined post condition defined for a batch processing system.

11. The method of claim 10, wherein the batch processing employs an automatically operated check for classes of vulnerabilities defined based on the predetermined post condition.

12. The method of claim 9, wherein the processing circuitry is further configured for
pruning and slicing of flow graphs.

13. The method of claim 9, wherein analyzing aliases comprises:

executing path generation to identify possible aliasing conditions associated with the program; and executing path analysis to independently evaluate the paths for aliasing.

14. The method of claim 9, wherein the processing circuitry is further configured for describing all possible aliasing combinations in a single expression.

15. The method of claim 14, wherein the processing circuitry is further configured for describing all possible aliasing combinations in a single expression via employing the satisfiability modulo theories (SMT) solver to exhaustively search for any alias combinations that are both possible and satisfy the post condition.

16. The method of claim 9, wherein processing loops further comprises:

identifying and representing all paths and loops;

determining loop dependencies to guide the order in which loops are enabled to be unrolled;

enabling user selection of a directed acyclic path from an entry point into the program to a target statement where the user desires the program to be;

determining the order in which loops along a selected path are enabled to be unrolled; and processing the loops in order using a loop unrolling approach.

17. The cloud based architecture of claim 1, wherein receiving the indication of the post condition comprises receiving a user input defining the post condition.

18. The cloud based architecture of claim 17, wherein the processing circuitry is further configured for receiving an indication from the user identifying a location at which to apply the analysis of the program.

19. The method of claim 9, wherein receiving the indication of the post condition comprises receiving a user input defining the post condition.

20. The method of claim 19, wherein the processing circuitry is further configured for receiving an indication from the user identifying a location at which to apply the analysis of the program.

* * * * *